June 30, 1964     H. A. BENZEL     3,139,114

SINGLY-ADJUSTABLE, MULTIPLE ORIFICE MEMBER

Filed Sept. 28, 1959

INVENTOR
Howard A. Benzel
BY Walter H. Popp
ATTORNEY

United States Patent Office 3,139,114
Patented June 30, 1964

3,139,114
SINGLY-ADJUSTABLE, MULTIPLE ORIFICE
MEMBER
Howard A. Benzel, Lancaster, N.Y., assignor to Scott
Aviation Corporation, Lancaster, N.Y.
Filed Sept. 28, 1959, Ser. No. 842,765
12 Claims. (Cl. 138—45)

This invention relates to a means for adjustably controlling the flow of a fluid by an adjusting member which is commonly termed an "orifice" member.

The principal objects of the invention are to provide an orifice member:

(1) Which, while having a single adjustment, nevertheless is constructed with a plurality of individual apertures so the pressure which is inducing a flow of fluid through the orifice member varies in approximately direct proportion to the volume of the fluid flowing through said orifice member.

(2) Which is constructed in such manner that the adjustment is affected by the distortion of one of its components, and that the component which is distorted is an inexpensive component so that it may be inexpensively replaced if distorted too far beyond its elastic limit.

Other objects of the invention and practical solutions thereof are disclosed in the following detailed description and in the accompanying drawing, wherein.

For convenience, this invention will be described exactly as it is here illustrated, but it is to be understood that the breadth of the patent is to be measured solely by the essential concept of the invention and the scope of the appended claims.

Figure 1:
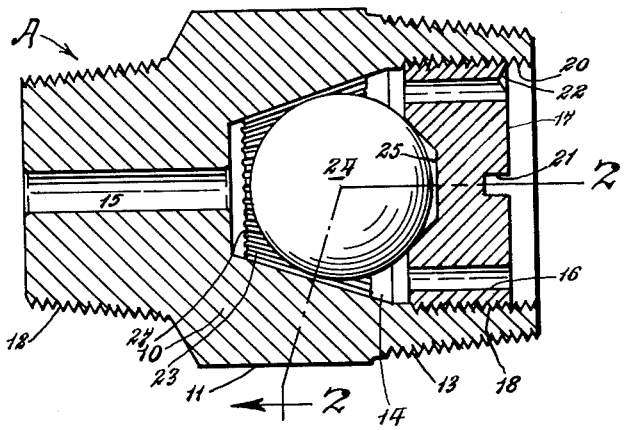
FIG. 1 is an enlarged, longitudinal, medial section through one form A of my improved, adjustable orifice member.
Figure 2:
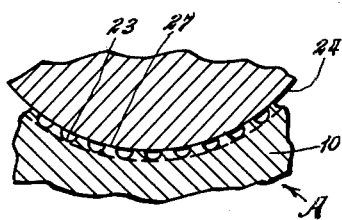
FIG. 2 is a fragmentary, transverse section thereof, taken on line 2—2, FIG. 1.
Figure 3:
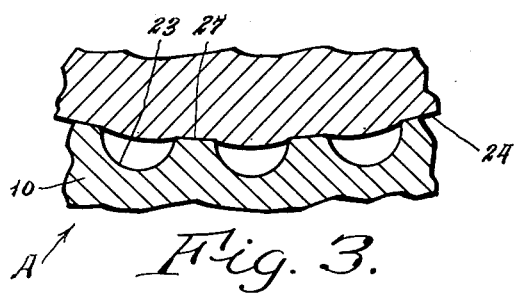
FIG. 3 is a very-greatly-enlarged, fragmentary, transverse section, similar to FIG. 2 but being sufficiently enlarged to illustrate the deformation of the spherical, pressure body 24.

FIGS. 1–3 Inclusive

The main body or casing 10 of this orifice member has a central hexagonal portion 11 so that the casing may be easily held by a wrench while being joined to the piping or fixtures to which it is adapted to be tubularly connected. This casing 10 is provided with a suitable pair of tapered pipe threads 12 and 13 for the purpose of effecting this tubular connection.

Arranged centrally in the casing 10 is a chamber 14 of frustro-conical shape, whose one (left) end tubularly communicates with the exterior of the casing through a coaxial duct 15, while its other (right) end communicates with the exterior of said casing through a number of longitudinal holes 16 that are drilled parallel to the axis of said casing 10 in an adjusting nut 17. The latter is exteriorly threaded at 18 to mesh with the female threads 20 that are suitably tapped in the right end of said casing 10. Rotation of this adjusting nut 17 is manually affected by inserting a screw driver in a screw-driver slot 21 which is formed transversely in the outer vertical face of said adjusting nut 17. After proper adjustment has been affected, said adjusting nut 17 is held in its adjusted position by being staked at 22.

The annular tapered wall of the chamber 14 is suitably formed to provide a plurality of corrugations 23, each of which is of substantially semi-cylindrical form. Pressed against said corrugations 23 is a pressure body 24 which, in this particular form of the invention, is of spherical shape and is constructed of a material which is softer than the material from which the casing 10 is constructed.

When the adjusting nut 17 is tightened the spherical pressure body 24 is pressed with an increasing amount of force against the corrugations 23, and, as said pressure body 24 is softer than the casing 10, it follows that the outer surface of said pressure body is partially pushed into said corrugations, as shown in FIG. 3 so as to obstruct to an increasing degree the free flow of fluid through said corrugations, and thereby to adjust the flow of fluid to said corrugations and through the orifice member A, taken as a whole.

It has been found that an orifice member thus constructed with a plurality of fluid passages 23 that are tubularly arranged in parallel with each other, provides an orifice member whose flow characteristics vary in approximately direct proportion with the imposed fluid pressure. This desirable feature is not obtained from an orifice having a single fluid passage. The principal feature of the present invention is that it provides a plurality of fluid flows 23 which are arranged in parallel but require only one single pressure body 24 to affect the adjustment of the flow.

In actual practice, it is preferred that the pressure body 24 be softer than the casing 10 so that said pressure body, if excessively distorted, may be inexpensively replaced inasmuch as it is the least expensive component of the orifice member A. This is, however, not an essential feature of the invention inasmuch as satisfactory results in actual practice are obtained even when the spherical pressure body 24 is either harder than or is of the same hardness as the casing 10.

It is desirable that the pressure imposed by the spherical pressure body 24 upon the adjusting nut 17 be located as close as possible to its threads 18. For this purpose said adjusting nut is hollowed out at its inner face in the form of a frustro-conical depression 25 so that the contact between said spherical pressure body 24 and said adjusting nut 17 is in the form of a circular line which is located relatively close to the threads 18 of said adjusting nut 17. However, if said adjusting nut 17 is thick enough, this frustro-conical depression 25 may be replaced by a plain, conical, easily machined depression (not shown). Alternatively, this frustro-conical depression 25 may be replaced by a semi-spherical, hollowed-out portion (not shown), the radius of which is somewhat less than the radius of the spherical pressure body 24 so as to obtain the same circular line contact as shown in FIG. 1.

FIG. 4

Figure 4:
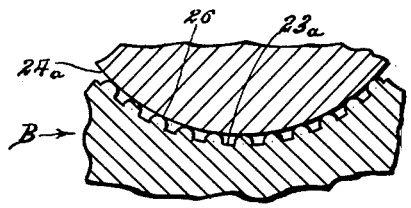
FIG. 4 is a fragmentary, transverse section, similar to FIG. 2, but showing a modified B form of the invention with its corrugations $23_a$ being of a different form from the corrugations 23 of FIG. 2.
Figure 5:
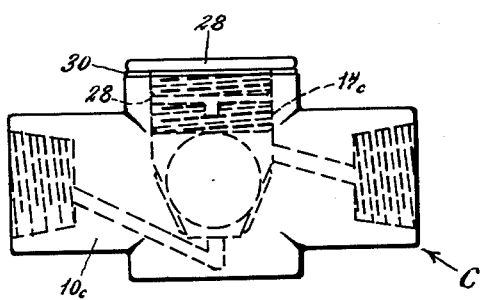
FIG. 5 is a diminutive, side elevation of a modified form C of the invention in which the adjustment of the orifice member C is effected without disturbing the piping that is connected with this orifice member C.
Figure 6:
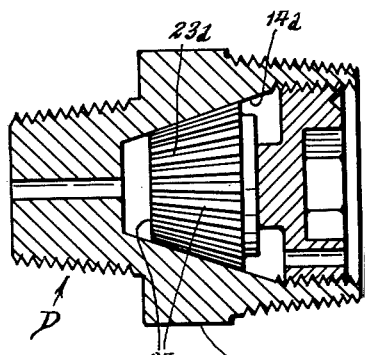
FIG. 6 is a diminutive, longitudinal, medial section somewhat similar to FIG. 1 but showing a modified form D of pressure body $24_d$ and casing $10_d$.

The orifice member of B of FIG. 4 is substantially the same as that of FIGS. 1–3 except that the corrugations 23 of FIGS. 1–3 are replaced by corrugations $23_a$ having such a shape as to form semi-cylindrical ribs 26 which make line contact with the spherical pressure body $24_a$ and hence are more easily deformed than the flat-faced ribs 27 as shown in FIGS. 1–3.

FIG. 5

This orifice member C is similar to that of FIGS. 1–3 except that said orifice member C is so constructed as to be capable of being adjusted without disturbing its tubular connections with the rest of the fluid apparatus with which it co-operates. In this form of the invention, the adjusting nut $17_c$ is recessed in the casing $10_c$ so that, after the adjustment of the fluid flow has been affected, any leakage of fluid past said adjusting nut $17_c$ may be prevented by a screw-threaded cover 28 which is provided with a resilient gasket 30.

*FIG. 6*

The modified orifice member D is similar to that of FIGS. 1–3 except that its pressure body $24_d$ is of frustro-conical shape and its corrugations $23_d$ are formed in the periphery of said pressure body $24_d$ instead of in the conical wall of the chamber $14_d$.

I claim:

1. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
   a casing having a chamber one of the walls of which has a plurality of corrugations;
   a pressure body arranged in said chamber in contact with said corrugations;
   means for mechanically forcing said pressure body against said corrugations with sufficient force to deform said pressure body.

2. An orifice as in claim 1 with the means for forcing the pressure body against the corrugations, said means being an adjustable nut threaded into the casing.

3. An orifice member comprising:
   a casing having a chamber one of the walls of which is smooth;
   a pressure body arranged in said chamber and having corrugations;
   means for mechanically forcing said pressure body against the smooth wall of said casing.

4. An orifice member as in claim 3 with the pressure body being conical.

5. An orifice member as in claim 3 with both the pressure body and the wall of the casing being conical.

6. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
   a casing having a chamber, one of the walls of which has a plurality of corrugations;
   a pressure body arranged in said chamber in contact with said corrugations;
   means for mechanically forcing said pressure body against said corrugations with sufficient force to deform said corrugations.

7. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
   a casing having a chamber one of the walls of which is of frusto-conical form and is corrugated;
   a pressure body arranged in said chamber in contact with said corrugations;
   means for mechanically forcing said pressure body against said corrugations with sufficient force to deform said pressure body.

8. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
   a casing having a chamber one of the walls of which is of frusto-conical form and is corrugated;
   a pressure body arranged in said chamber in contact with said corrugations;
   means for mechanically forcing said pressure body against said corrugations with sufficient force to deform said corrugations.

9. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
   a casing having a chamber one of the walls of which is of frusto-conical form and is corrugated;
   a pressure member of spherical shape arranged in said chamber in contact with said corrugations;
   means for mechanically forcing said pressure member against said corrugations with sufficient force to deform said pressure member.

10. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
    a casing having a chamber one of the walls of which is of frusto-conical form and is corrugated;
    a pressure member of spherical shape arranged in said chamber in contact with said corrugations;
    means for mechanically forcing said pressure member against said corrugations with sufficient force to deform said corrugations.

11. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
    a casing having a chamber, one of the walls of which has a plurality of corrugations;
    a pressure member of spherical shape arranged in said chamber in contact with said corrugations;
    means for mechanically forcing said pressure member against said corrugations with sufficient force to deform said pressure member.

12. An adjustable orifice member having inlet and outlet fluid ducts and adapted to permanently and inelastically control the rate of flow of the fluid passing through said orifice member in such a manner as to permit of a volume of flow in direct proportion to the imposed fluid pressure, and comprising:
    a casing having a chamber, one of the walls of which has a plurality of corrugations;
    a pressure member of spherical shape arranged in said chamber in contact with said corrugations;
    means for mechanically forcing said pressure member against said corrugations with sufficient force to deform said corrugations.

References Cited in the file of this patent

UNITED STATES PATENTS

| | | |
|---|---|---|
| 1,923,408 | Zerk | Aug. 22, 1933 |
| 2,511,733 | Morrison | June 13, 1950 |
| 2,762,397 | Miller | Sept. 11, 1956 |
| 2,781,060 | Frey | Feb. 12, 1957 |
| 2,802,486 | Frey | Aug. 13, 1957 |
| 2,853,264 | Lodge | Sept. 23, 1958 |
| 2,861,590 | Loehle | Nov. 25, 1958 |
| 2,878,836 | Binks | Mar. 24, 1959 |